US007068881B2

(12) United States Patent
Yoo

(10) Patent No.: US 7,068,881 B2
(45) Date of Patent: Jun. 27, 2006

(54) OPTICAL CODE DIVISION MULTIPLE ACCESS NETWORK UTILIZING RECONFIGURABLE SPECTRAL PHASE CODING

(75) Inventor: Sung-Joo Ben Yoo, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 174 days.

(21) Appl. No.: 10/645,165

(22) Filed: Aug. 20, 2003

(65) Prior Publication Data

US 2004/0037500 A1    Feb. 26, 2004

Related U.S. Application Data

(63) Continuation of application No. 60/405,947, filed on Aug. 26, 2002.

(51) Int. Cl.
G02B 6/26 (2006.01)
G02B 6/28 (2006.01)

(52) U.S. Cl. .............................. 385/31; 385/24; 385/3; 398/78; 398/190

(58) Field of Classification Search ..................... None
See application file for complete search history.

(56) References Cited

U.S. PATENT DOCUMENTS

| 4,866,699 | A | | 9/1989 | Brackett et al. ............... 370/3 |
|---|---|---|---|---|
| 4,928,316 | A | | 5/1990 | Heritage et al. ............ 455/600 |
| 6,025,944 | A | * | 2/2000 | Mendez et al. ................ 398/78 |
| 6,628,864 | B1 | * | 9/2003 | Richardson et al. .......... 385/37 |
| 2002/0105705 | A1 | | 8/2002 | Turpin et al. ................ 359/173 |
| 2003/0058504 | A1 | * | 3/2003 | Cho et al. .................... 359/161 |
| 2003/0147116 | A1 | * | 8/2003 | Shpantzer et al. .......... 359/264 |
| 2003/0147646 | A1 | * | 8/2003 | Zitelli ......................... 398/65 |
| 2003/0147655 | A1 | * | 8/2003 | Shattil ........................ 398/182 |
| 2004/0047543 | A1 | * | 3/2004 | Hiironen et al. .............. 385/16 |
| 2005/0053377 | A1 | * | 3/2005 | Yoo ............................. 398/79 |
| 2005/0084266 | A1 | * | 4/2005 | Pohjola et al. ................ 398/77 |

OTHER PUBLICATIONS

M. C. Chia et al., "Packet loss and delay performance of feedback and feed-forward arrayed-waveguide gratings-based optical packet switches with WDM inputs-outputs", *Journal of lightwave technology*, vol. 19, No. 9, Sep. 2001, pp. 1241-1254.

T. Baba et al., "Photonic crystal light deflection devices using the superprism effect", *IEEE journal of quantam electronics*, vol. 38, No. 7, Jul. 2002, pp. 909-914.

* cited by examiner

*Primary Examiner*—John D. Lee
*Assistant Examiner*—Kevin S. Wood
(74) *Attorney, Agent, or Firm*—Park, Vaughan & Fleming LLP

(57) ABSTRACT

An optical code-division multiple-access (O-CDMA) apparatus, network, and communications method. A transmitter data modulates a sequence of ultra-fast (~1 ps) pulses. An encoder wavelength demultiplexes the pulses, separately phase-modulates the wavelength components according to a first CDMA code and wavelength multiplexes for transmission on an optical network. A receiver includes a decoder performing similar demultiplexing, phase-modulating according to a second CDMA code, and multiplexing. The receiver detects the resultant signal. If the two CDMA codes match, the detected signal replicates the data-modulated pulses. The apparatus may be formed in as few as one substrate. The encoder/decoder structure may be used to compensate the dispersion of a fiber. A short-pulse detector includes a Mach-Zehnder interferometer having two semiconductor amplifier regions in its two arms with differential delay/phase between them. A probe signal and the signal to be detected are both split into the arms together and thereafter differenced on the output.

12 Claims, 8 Drawing Sheets

OPTICAL CODE DIVISION MULTIPLE ACCESS NETWORK UTILIZING RECONFIGURABLE SPECTRAL PHASE CODING

RELATED APPLICATION

This application claims benefit of provisional application Ser. No. 60/405,947, filed Aug. 26, 2002 and incorporated herein by reference in its entirety.

BACKGROUND OF THE INVENTION

1. Field of the Invention

The invention relates generally to optical communications systems. In particular, the invention relates to optical code division multiple access.

2. Background Art

Communication networks based on optical fiber as the transmission medium have the potential of extremely wide bandwidth measured in many terahertz. However, transmitters and receivers are partially based on electronics and thus limited at the present time to about 10 gigabits per second (Gb/s). Further substantial increases in speed are unlikely. Even the 10 Gb/s equipment is expensive, large, and power intensive. Wavelength division multiplexing (WDM) has been utilized to increase the data bandwidth while using electronics of limited speed. In WDM, multiple optical carriers of wavelengths differing by about a nanometer or less are impressed with separate data signal and are then multiplexed onto a single optical fiber. However, WDM does not fully exploit the available bandwidth, at least partially because of the necessity of completely separating the spectrally different WDM components at the receiver or at any switching points in the network. Conventional WDM and time division multiplexing (TDM) schemes require relatively complex and expensive WDM or TDM switches or multiplexers at the central nodes to distribute traffic in formats limited by the WDM and TDM schemes to other nodes. Such schemes are not attractive for access networks needing equipment of low cost and high bandwidth.

Optical code division multiple access (O-CDMA) has been proposed. However, these have often been derived from RF CDMA architectures in which a series of pulses are amplitude modulated with a code. For optical systems this amounts to power modulation. Such an approach does not circumvent the need to operate the electronics at very high bit rates. Furthermore, the binary coding of pulses allows a relatively small number of uses to be transmitting with different codes without interference. Other O-CDMA systems have included a 2-D grid of wavelength and time. These are considered too cumbersome.

O-CDMA is most easily applied to local area networks to which a large number of user terminals are attached. However, cost is an issue so that it is desired that the user terminals operate at significantly lower bit rates than the aggregate bit rate of the network.

Long-haul optical communications networks typically rely upon a shared network, for example, a public telephone network. Since public networks are subject to eavesdropping, the network security needs to be improved for users sending highly sensitive information, such as the military.

SUMMARY OF THE INVENTION

An optical code-division multiple-access communications (O-CDMA) network allows intercommunication between a large number of users in which a CDMA code is assigned to each receiver. A transmitter generates a sequence of ultra-fast (~1 ps) optical pulse and according to a binary data code modulates the sequence. In an encoding process, the pulse is spectrally separated into a number of wavelength components and each wavelength components is phase-modulated according to a first CDMA code. The phase-modulated wavelength components are recombined to form a spread pulse for transmission on an optical network. At the receiver, a decoder receives the spread pulse, spectrally separates it into its wavelength components, phase-modulates the wavelength components according to a second CDMA code, recombines the phase-modulated wavelength components, and optically detects the resulting pulses. If the second code matches the first one, the resulting pulses replicate the data-modulated transmitter pulses; if not, essentially noise is detected.

According to another aspect of the invention, an apparatus incorporating an O-CDMA transmission protocol is integrated into no more than four integrated optical circuit chips, preferably no more than two, and most preferably on a single integrated circuit, for example, formed in an InP substrate. The drive electronics may be incorporated into a separate integrated circuit, either of GaAs or Si. Control logic may be integrated into a Si integrated circuits. The various integrated circuits may be bonded together in a laminated structure.

The multiplexers and demultiplexers of the encoder or decoder apparatus may be implemented in arrayed waveguide gratings (AWGs) formed in a substrate. The phase modulation may be formed by electrically controlled phase modulators situated on waveguides between the two AWGs.

Apparatus resembling the encoder or decoder may be used also for compensating the dispersion of a fiber.

A short-pulse detector, which may be used in the O-CDMA receiver, includes a Mach-Zehnder interferometer including two arms, each with a semiconductor optical amplifier. An optical probe signal, either CW, pulsed CW, or short optical pulse, and a short pulse signal to be detected are split between the two arms, in which the two semiconductor optical amplifiers produce cross gain between the probe signal and the signal to be detected. The resultant signals are combined to be a difference between them, and optically detected.

The O-CDMA network is particularly useful as a local area network (LAN) forming a lower layer of a larger optical network.

DETAILED DESCRIPTION OF THE PREFERRED EMBODIMENTS

Figure 1:
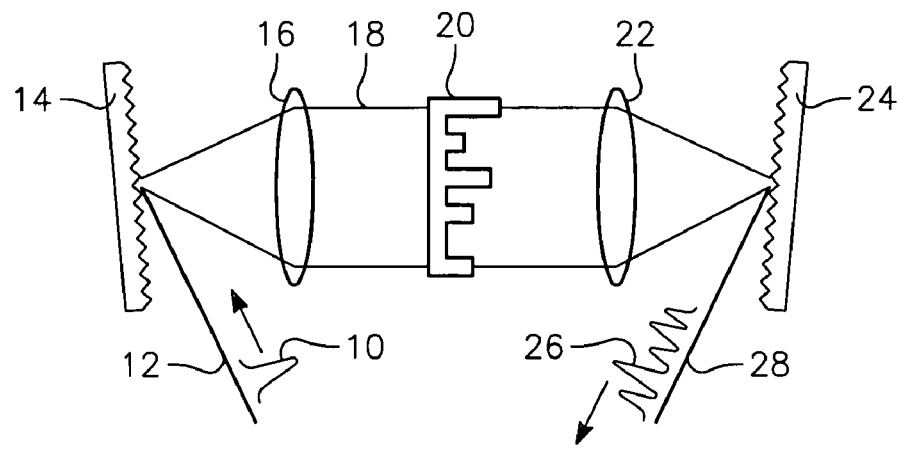
FIG. 1 is a pictorial illustration of a prior-art method for spectrally encoding an optical pulse.

The invention includes an optical code division multiple access (O-CDMA) communications systems that use electronically controlled optical phase masks. The concept is more easily explained in reference to FIG. 1 to a prior art system described by Weiner et al. in "Encoding and decoding of femtosecond pulses," *Optics Letters*, vol. 20, no. 12, 1985, pp. 609–611 and by Bracket et al. in U.S. Pat. No. 4,866,699. Heritage et al describe a variant in U.S. Pat. No. 4,928,316. A very short optical pulse 10 traveling along an input path 12 towards a Bragg diffraction grating 14. Because of its narrow time extent, the pulse 10 contains a significant spread of optical wavelengths. The diffraction grating 14 spectrally separates the wavelength into respective angularly separated components. A first lens 16 recollimates the optical pulse into a wide collimated beam 18 so that the different spectral components are traveling in parallel but physically separated paths through a Fourier plane when they strike a hard phase mask 20, for example, a material having a non-unity refractive index and having a thickness varying across the collimated beam 18. As a result, different time delays or phases are imposed on the different wavelength components. A second lens 22 focuses the collimated beam 18 with its differential phases onto a second diffraction grating 24 that recombines the wavelength components into a narrow collimated beam for an output pulse 26 traveling along an output path 28. However, because of the differential time delays for the different wavelength components, the output pulse 26 has a significantly larger pulse width than the ultra-fast input pulse 10. The wide output pulse 26 may be referred to as a spread pulse The described optics are linear and reciprocal. As a result, if the illustrated spread pulse 26 were passed as an input pulse through the system in the opposite direction, the system would replicate the narrow pulse 10 as an output pulse. That is, the phase mask 20 can be considered to be impressed with a code that can encode a narrow pulse into a spread encoded pulse and can also decode (subject to a matching condition described below) the spread encode pulse into a narrow pulse. On the other hand, if the phase mask at the receiver is differently coded to not match the code at the receiver, the receiver produces not a narrow pulse but a wide distribution of signal nearly indistinguishable from noise. It should be noted however that the reciprocity includes a time inversion with the result that the reshaping of the spread pulse into a narrow pulse requires that the spread pulse on decoding must have the opposite time dependence as the spread pulse produced in the first place. As a result, if the first spread pulse is to be reshaped into a narrow pulse without a time inversion, the phase mask used for reshaping must have a conjugate phase pattern from that initially used to form the spread pulse. The terminology will be used of matching codes for encoding and decoding. For a lossless mask, a conjugate phase pattern is a negative of the original phase pattern, which can be accomplished by measuring the positive and negative phase values from a base phase shift, for example, of $2\pi$. The complementary phase patterns give rise to the terminology of the key of the receiver matching the lock of the transmitter. Only if the key exactly matches or fits into the lock, can the receiver decode the message encoded by the transmitter.

In the context of telecommunications, multiple transmitters and multiple receivers may be connected to a network. A transmitter generates a sequence of narrow pulses which are modulated into zero and finite pulses to represent binary data. The transmitter imposes such a code on each pulse by differentially phase modulating its wavelength components. The differentially phase modulated pulses are then input to the network and received at all the receivers. However, only the one or more receivers having the conjugate of the same code recover the narrow pulses. Receivers that have non-matching codes detect only background noise. Further, in some applications, the multiple transmitters need not be synchronized as long as they are all using different codes. Even though spread pulses of different codes may temporally overlap as they propagate around the network, the decoding extracts the narrow pulse sequence from the overlapping spread pulses.

Figure 2:
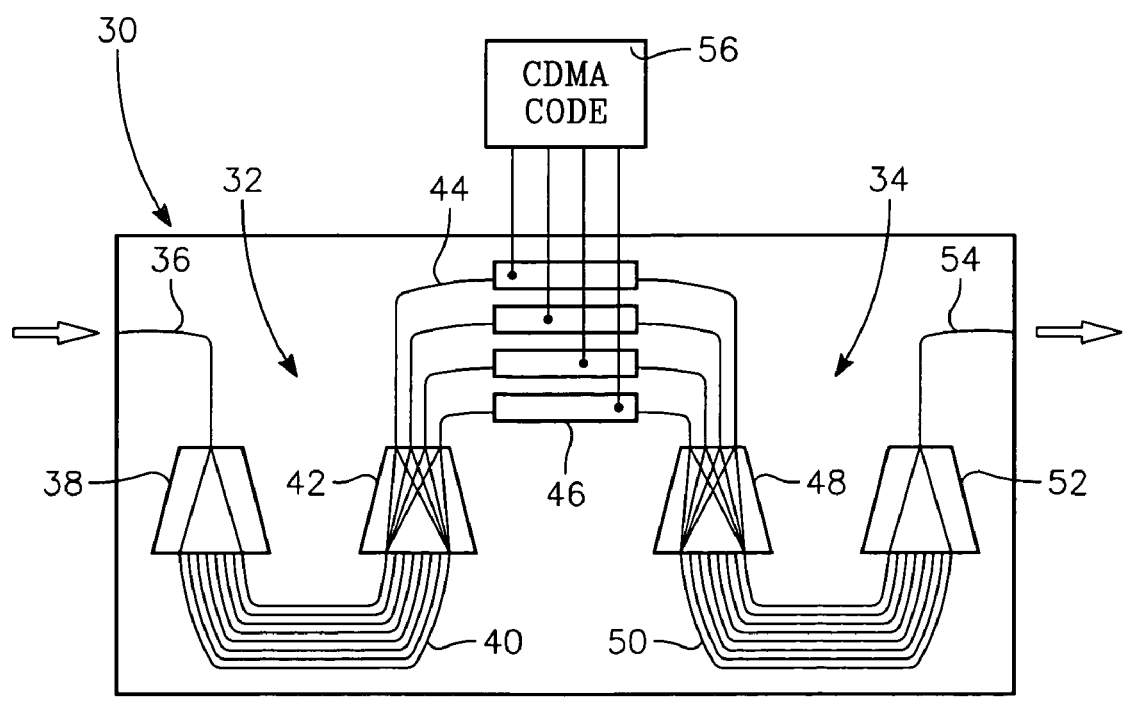
FIG. 2 is schematic plan view of a block used in a method of the invention for either spectrally encoding or decoding an optical pulse.

An O-CDMA telecommunication system enabled by the invention may be based on a building block illustrated in the circuit diagram of FIG. 2, which may be used as part of either the transmitter or receiver. In a substrate 30 are formed a demultiplexer 32 and a multiplexer 34, preferably formed of arrayed waveguide gratings (AWGs). An input waveguide 36 formed in the substrate 30 receives an optical signal and conveys it to an input side of a first free-space region 46, in which the optical signal diverges. A plurality of grating waveguides 40 are connected from the output side of the first free-space region 38 to the input side of a second free-space region 42. The lengths of the grating waveguides 40 between the two free-space regions 38, 42 differ by predetermined amounts thereby introducing differential phases to the optical signals entering the second free-space region 42 and then diverging towards the output side and there combining and constructively or destructively interfering. The interference depends upon wavelength so the system acts as a diffraction grating to spectrally separate the optical signal across the output side of the second free-space region 42. The two free-space regions 38, 42 and array gratings 40 form an AWG acting as a wavelength demultiplexer.

A plurality of modulator waveguides 44 receive the different spectral components from the output side of the second free-space region 42. Each of the modulator waveguides 44 includes a separately controlled phase modulator 46 to selectively and dynamically control the phase or time delay of the wavelength component passing through it. Although four phase modulators 46 are illustrated, this should be considered a minimum number and many more are desired for effective CDMA communication between multiple users.

The modulation waveguides 44 are connected to a third free-space region 48 and then through second grating waveguides 50 to a fourth free-space region 50, the latter three elements forming a second AWG having a structure mirroring that of the first AWG and operating as a wavelength multiplexer to create a combined signal of the phase-modulated wavelength components on an output waveguide 54.

The phase modulators 56 are controlled according to a CDMA code 56. The CDMA code includes multiple bits for every modulator 46 in a multi-level code, for example, two bits in a four-level code. In one type of operation, the CDMA code 56 is stored in memory, semi-permanently for a receiver and for the duration of a message for a transmitter which identifies the receiver according to the code. In another type of operation, the CDMA code 56 is changing every pulse or every few pulses according to a preset pattern.

Figure 3:
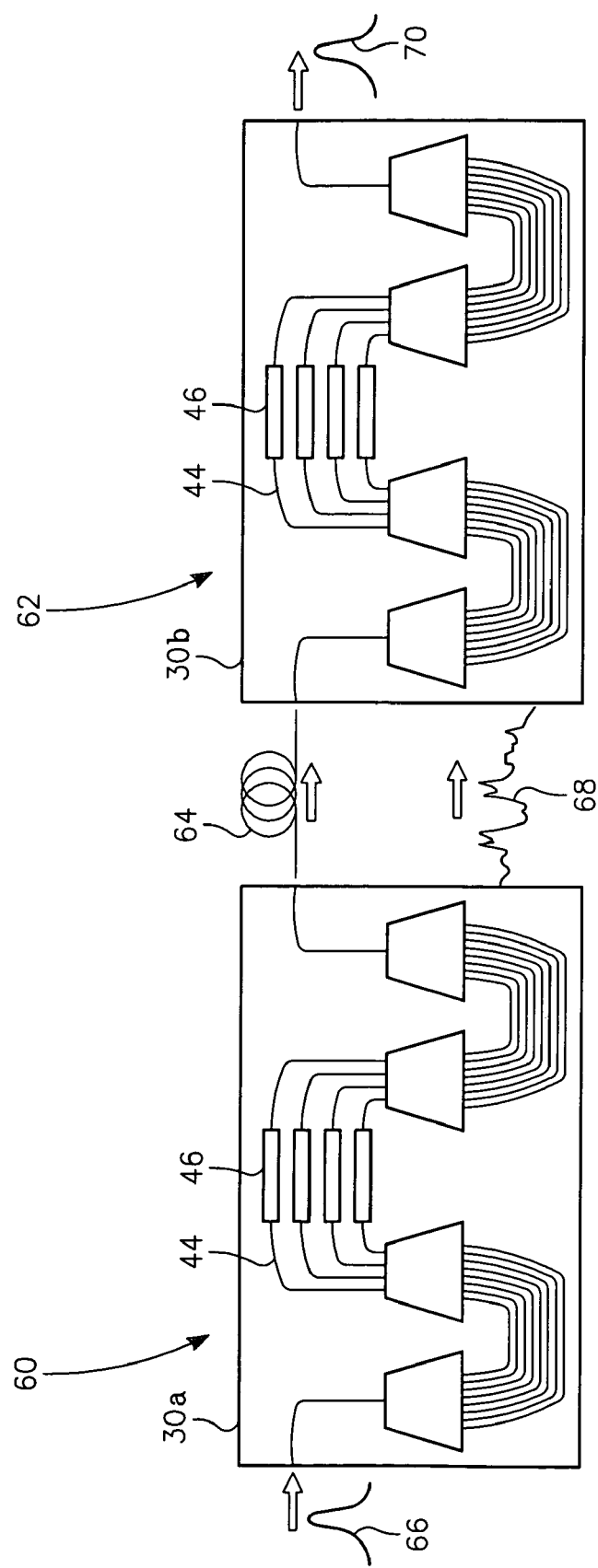
FIG. 3 is a schematic plan view of two of the blocks of FIG. 2 used in a CDMA transmission system.

The building block of FIG. 2 can be used as either an encoder and decoder operating according to the plurality of control signals applied to the modulators 46. A simultaneous set of modulator control signals constitutes a CMDA code. A more complete O-CDMA communication system illustrated in the schematic circuit diagram of FIG. 3. includes a transmitter encoder 60 and a receiver decoder 62 formed in respective substrates 30a, 30b linked through a network including an optical fiber 64. It is understood that the network is typically more than the illustrated point-to-point link and may include a large number of such transmitters 60 and receivers 62.

The fiber 64 of the network connects the output waveguide 54 of the transmitter encoder 30 with the input waveguide 36 of the receiver decoder 62. However, other optical transmission media are included in the invention, for example, free-space transmission within an office or to and from space satellites. In an O-CDMA network, a timed sequence of data-modulated, very narrow or ultra-fast input pulses 66 are input to the input waveguide 36 of the transmitter encoder 60. The modulators 46 of the transmitter's encoder 60 are controlled according to a code to encode the input pulse 66 to an encoded (alternatively called time-spread or spectrally encrypted) pulse 68 on the fiber 64. If the code controlling the modulators 46 of the receiver decoder 62 is the conjugate of the code at the transmitter encoder 60, the receiver decodes the encoded pulse 66 to a narrow output or decoded pulse 70 on the receiver decoder's output waveguide 54. On the other hand, if the modulators 36 of the receiver encoder 62 are controlled according to a code significantly different from the conjugate of that of the transmitter 30, the decoded pulse 70 is a wide pulse differing little from background noise.

The two arrayed waveguide gratings for each substrate 30a, 30b cover the spectral range of the ultra-fast pulse, for example, 1 ps pulse width. A pulse width is measured at full width half maximum. In the current state of the art, 1080 wavelength channels with 25 GHz channel spacing can be formed in silica substrates, with each channel corresponding to a modulation waveguide 44 having its own separately controlled modulator. Presently, InP technology is limited to 128 wavelength channels with 50 GHz spacing although an increase to 256 channels is expected. Use of 256 wavelength channels permits the application of 256 element multi-level phase codes, which is sufficient to support more than 200 simultaneous users with a bit error rate below $10^{-9}$. It has been found that, because ultra-fast pulses have a gaussian spectrum, the orthogonality of the coding is increased if the wavelength channels at the edges of the spectrum are wider to have the effect that nearly equal amounts of power are being modulated in each of the channels. The number of channels is limited primarily by the bending loss. Such bending loss can be substantially reduced, that is, the number of channels increased, by using photonic band structure in the waveguide bends, as describe by Baba et al. in "Photonic Crystal Light Deflection Devices Using the Superprism Effect," *IEEE Journal of Quantum Electronics*, vol.38, no. 7, July 2002, pp. 909–914.

The phase modulation of the spectrally spread pulse offers significant advantages over the conventional RF-derived O-CDMA networks involving amplitude coding of successive pulses, which amounts to a unipolar or binary code of ones and zeros. In contrast, phase modulation of the spread spectrum allows multi-level coding of M values, where M is 3 or greater. In terms of phase, a ternary code includes the phase values of $\{0, 2\pi/3, 4\pi/3\}$, a quaternary code includes phase values of $\{0, \pi/2, \pi, 3\pi/2\}$. Yet higher phase codes are available depending upon the resolution of the modulators. If multiple signals are possibly being transmitted simultaneously across the network with different codes to distinguish them, interference between signals is minimized if the codes are orthogonal or nearly so. Particularly for asynchronous transmission systems in which the transmitters are not synchronized with the receivers, it is easier to achieve nearly orthogonal codes with larger number of levels in the codes.

In an O-CDMA network with a large number of users, the bit error rate (BER) can be decreased to the desirable levels of less than $10^{-9}$ by the use of forward error correction (FEC), for example, by Reed-Solomon or finite geometry low-density parity check codes. Even if the net data rate is reduced to 60% by strong FEC, the BER is decreased by several orders of magnitude, producing a commercially usable system.

The phase modulators 46 can be additionally used to compensate for dispersion on the fiber. The compensation may be a pre-compensation performed at the transmitter or a post-compensation performed at the receiver or a combination. The compensation is not fixed, as is the case for dispersion compensated fibers inserted into the path but may be adjusted for different paths between the transmitter and receiver. Furthermore, a single block of FIG. 2 may be used as a dedicated dispersion compensator independent of any CDMA coding, in which case the dispersion correcting code is typically much more smoothly varying than for a CDMA code, for example, having monotonically increasing or decreasing phase across the spectrum of interest. Multi-level control of the phase modulators is particularly advantageous for phase dispersion correction.

Figure 4:
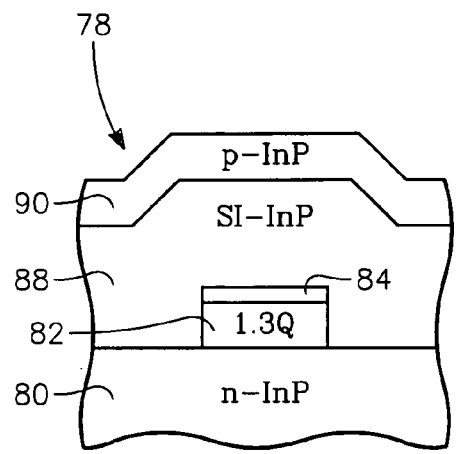
FIG. 4 is a sectional view of the structure of passive region of a semiconductor chip used to integrate spectrally spread optical CDMA (O-CMDA) transmission system on a chip.

The fabrication of InP AWGs and active elements, such as modulators, has been described by Yoo in U.S. patent application, Ser. No. 10/081,396, filed Feb. 22, 2002, now issued as U.S. Pat. No. 6,768,827, and incorporated herein by reference in its entirety, which focuses on integrated optical routers. The entire block of FIG. 2 can be formed in one monolithic structure based on buried heterostructure waveguides for both the passive and modulator sections. As illustrated in the cross-sectional view of FIG. 4 for a passive section 78, in particular the waveguides and the free-space regions, over an n-type InP substrate 80 is grown an patterned an InGaAlP quaternary region 82 have a composition corresponding to a photo luminescent wavelength of 1.3 μm. An etch stop layer 84, for example, 20 nm of undoped InP is deposited over the quaternary layer 82. The laser section to be described later includes a quantum well structure. In the integrated chip, the quantum well layer is deposited over the etch stop layer 84 in all regions of the chip but is etched away in all of the non-laser regions with the etch stop layer 84 defining the end of the quantum well etch. These layers are patterned to form a ridge waveguide. For the waveguide sections, the waveguide width is chosen to provide a single-mode waveguide. For the free-space regions, the waveguide width is much wider and shaped to provide coupling between the input and output ports but it nonetheless is vertically confining. In the interest of maximizing power coupling rather than minimizing cross talk and to allow modulation channels of variable bandwidth, it is advantageous to include multi-mode interference (MMI) filters between at least some of the waveguides and the free space regions, as has been described by Buithuis and Amersfoort in U.S. Pat. No. 6,289,147. The waveguide is buried by the subsequent deposition of a layer of semi-insulating InP layer 88 to electrically isolate the buried waveguide. For integration purposes, a top layer 90 of n-type InP is deposited over the semi-insulating InP layer 88.

Figure 5:
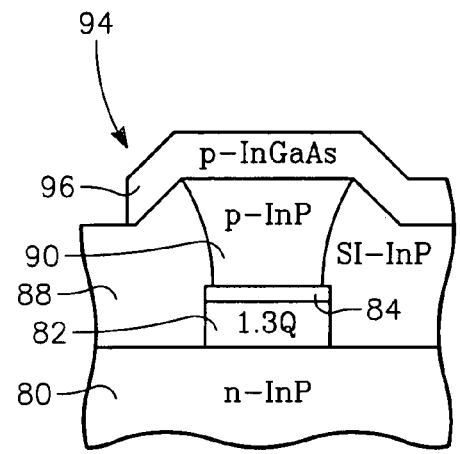
FIG. 5 is a sectional view of the structure of a modulator region of the semiconductor chip of FIG. 4.

As illustrated in the cross-sectional view of FIG. 5 for a modulator section 04, a single-mode waveguide is similarly formed over the InP substrate 80 and is initially buried by the semi-insulating InP layer 88. However, a contact hole to the waveguide is defined through the semi-insulating layer 88 and is filled by the p-type layer 90, which completes the diode heterojunction with the waveguide. A p-type InGaAs layer 96 is used to contact the p-type layer 90 in the contact hole and to provide a bonding pad away from the waveguide. With the proper length of the modulator 94, variation of current supplied to the heterojunction between 0 and 30 mA produced a phase variation of between 0 and $2\pi$, all that is needed for phase coding.

A communication system requires the ultra-fast optical pulses to be generated at the transmitter and detected at the receiver. With proper design, ultra-fast pulse generators can be included in the same chip as the encoder. Colliding pulse mode-locked (CPM) lasers provide ultra-fast pulses in which the pulse repetition rate is determined by the effective cavity length and the pulse width is a function of the gain recovery time, the saturable absorber recovery time, dispersive mechanism in the cavity, and other parameters such as RF drive conditions if hybrid mode-locking is used. Hansen et al. have disclosed such a ring laser in "A 1.5-µm monolithic semiconductor ring laser: CW and mode-lock operation." *IEEE Photonics Technology Letters*, vol. 4, no. 5, 1992, pp. 411–413. Typical pulse widths are 1 ps and repetition rates of 10 to 350 GHz. A preferred ring laser is designed for 10 GHz repetition rates of 1 ps pulses in a hybridly lock CPM laser with a time-bandwidth product ($\Delta\tau\times\Delta\nu$) of about 0.35. The hybrid mode-locking allows synchronization of 10 GHz repetition rates with the 10 Gb/s data modulation clock to ensure that the data amplitude modulation occurs on the pulses themselves.

Figure 6:
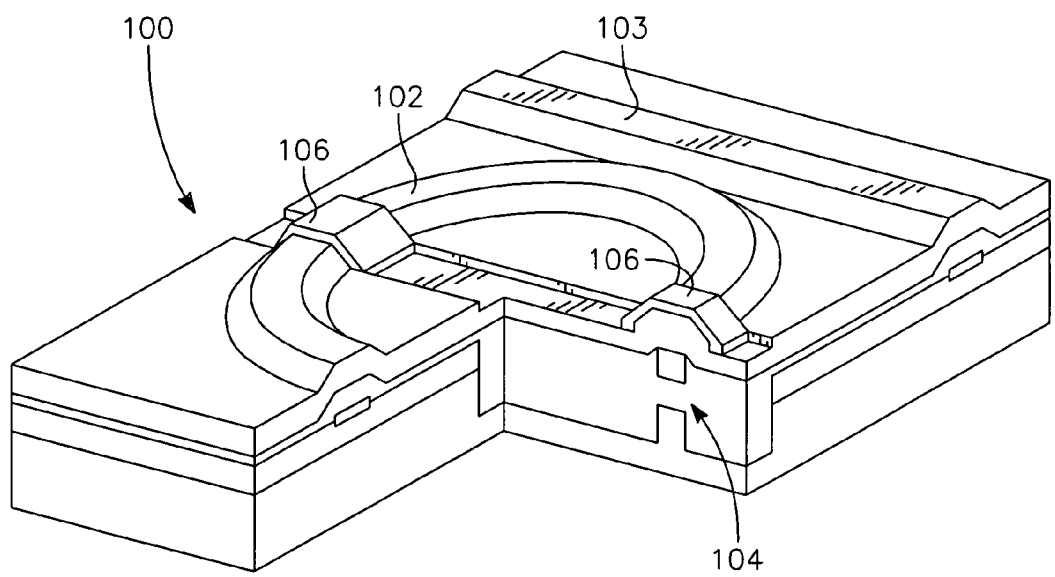
FIG. 6 is a partially sectioned orthographic view of a ring laser formed in the semiconductor chip of FIGS. 4 and 5.
Figure 7:
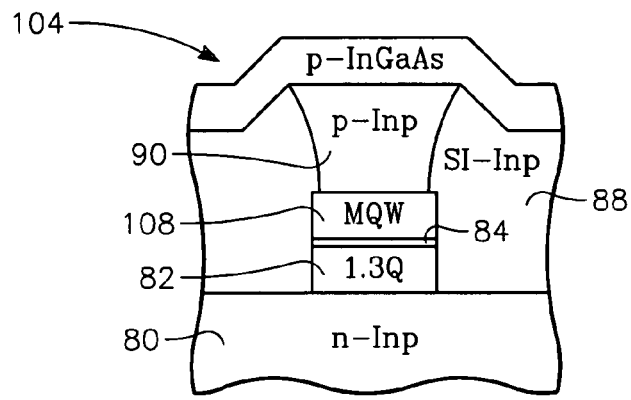
FIG. 7 is sectional view of the structure of an active region formed in the chip of FIGS. 4, 5, and 6.

Such a ring laser 100, illustrated in the partially sectioned orthographic view of FIG. 6, includes a ring waveguide 102 tangent coupled to a linear output waveguide 103. The linear waveguide 103 and most of the ring waveguide 102 is passive with a structure discussed previously with respect to FIG. 4. However, the ring waveguide 102 includes two active regions 104 beneath AuZn/Au contacts 106. The vertical structure of each of the active regions 104 is illustrated in the cross-sectional view of FIG. 7. It is similar to the modulator region 94 of FIG. 4 except that a multi quantum well (MQW) region 108 is grown over the etch stop layer 84 and is masked during the quantum well etch. The MQW region 108 may include six quantum well regions, each composed of 7 nm of InGaAs having a composition of 1.25Q and 7 nm of $In_{0.53}Ga_{0.47}As$, both layers being undoped. Thereafter, the MQW region 108 and the other layers 82, 84 are patterned to form a waveguide. Thereafter, the contact hole is etched down to the MQW region 108 and is filled with the p-InP layer 90 to contact it. This structure is also used for the semiconductor optical amplifiers.

The junction of one of the active regions 104 is positively biased to provide gain while the junction of the other is negatively biased to provide saturable absorption. The ring causes two counter-propagating pulses to grow and eventually lase since, when the pulses cross or collide in the absorber, the absorber becomes even more transparent than for less than two colliding pulses. The lasing pulses are partially coupled to the linear waveguide 103 in the tangent region. The pulse width may be between 300 fs and 1 ps and the pulse repetition rate is determined by half the ring cycle time, which is selected to be 10 Gb/s. However, other pulse widths may be used. For example, up to 10 ps pulse widths still provide good phase encoding. Other pulse repetition rates may be used. Higher pulse rates need faster electronics. Significantly lower pulse rates ranging down to 1 Gb/s or even lower may need different types of optical pulse generators.

The linear waveguide 103 has two output ends. One output will be data modulated at 10 Gb/s and phase encoded, as described previously. The other output can be used for diagnostic purposes or for injection locking of another CPM laser in the receiver if synchronous detection is used to allow for more than 1000 simultaneous users.

As should be apparent, the ring laser can integrated on the same InP substrate as the transmitter encoder together with a data modulator to form a monolithic O-CDMA transmitter. Further, as will be shown later, the receiver decoder and detector can also be integrated on the same InP substrate to form a monolithic O-CDMA transceiver.

Figure 8:
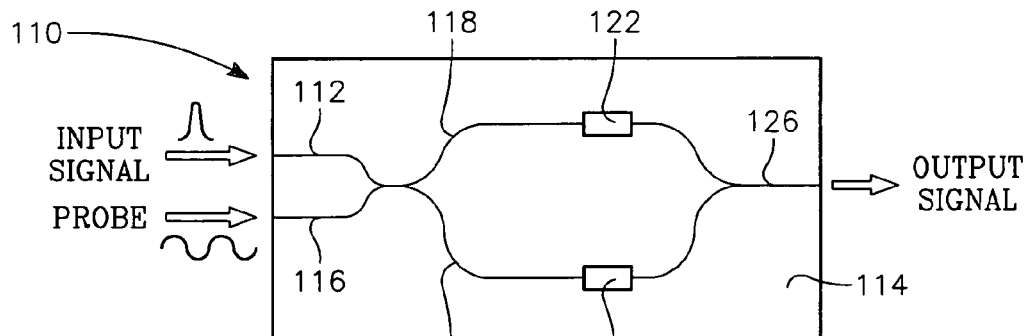
FIG. 8 is a plan view of part of an asymmetric Mach-Zehnder detector.

The detection of ultra-fast pulses in the presence of a noisy O-CDMA background presents challenges, which are substantially met by asymmetric Mach-Zehnder differential interferometric detection. A simple form of an differential detector 110, illustrated in the plan view of FIG. 8, is derived from technology developed for wavelength converters presented in the Yoo patent application cited above. An ultra-fast input pulse is input to a waveguide 112 formed in a substrate 114, for example, of InP. For O-CDMA networks, the input pulse from the receiver decoder contains spectral components in the 1535 to 1565 nm band. A CW probe signal outside of the signal band is input to a second waveguide 116. For integration on InP, the probe wavelength can be at 1520 nm, which is the edge of the transparency window of the semiconductor amplifier. The signals of the two waveguides 112, 116 are combined and then split into two waveguide arms 118, 120 of a Mach-Zehnder interferometer. However, the two arms 118, 120 having lengths producing a differential phase $\Delta\varphi=\varphi_1-\varphi_2$ between them, which corresponds to a differential time $\Delta t$. The MZ waveguide arms 118, 120 include respective similar semiconductor optical amplifiers 122, 124. Other means than differential length can be used to obtain the desired phase difference, for example, use of one or two phase modulators described before for the encoding/decoding or differential biasing of the optical amplifiers 122, 124.

Figure 9:
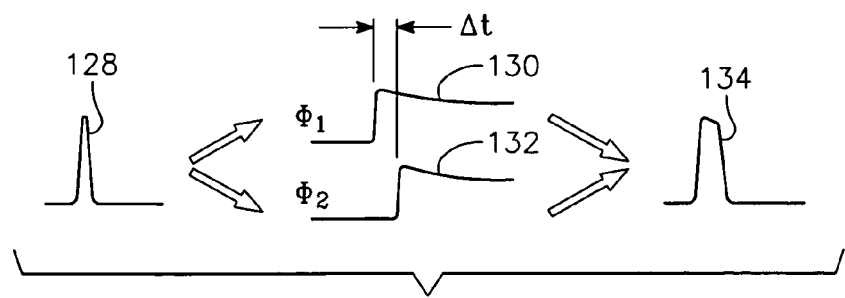
FIG. 9 is a timing diagram for signals on the Mach-Zehnder detector of FIG. 8.

After passing the semiconductor amplifiers 122, 124, the two signals are recombined on an output waveguide 126 producing the output signal. As illustrated in the timing diagram of FIG. 9, an intense ultra-fast input pulse 128 very quickly saturates the gains of the two amplifying regions 122, 124 because of enhanced stimulated emission. The strong signal pulses thus changes the opacity of the semiconductor amplifier regions 122, 124 to produce the two arm signals of the probe signal but at times, measured on the output waveguide 126, which are separated by the differential time $\Delta t$. After the fast rise, the two arm signals 130 132 slowly decrease because of slow gain recovery arising from the relatively long carrier lifetimes, 100 to 400 ps depending on the current injection level when the signal is low. The baseline biases of the two semiconductor amplifiers 122, 124 or other means are chosen to produce a differential phase between them of $\pi$ so that the two arm components 130, 132 recombine to form a difference rather than a sum between them. A resultant pulse shaped output signal 134 has a pulse width of approximately $\Delta t$ plus the width of the input signal 128. On the other hand, if the input signal has a long pulse width and relatively low instantaneous intensity, there is only a slight broadening and without saturation there is no great difference between rise and fall times. As a result, the MZ differential detector discriminates against noise and wide but weak pulses in favor of intense short pulses, precisely the behavior desired for O-CDMA. The time differential $\Delta t$ is chosen to be larger than the pulse width of an ultra-fast pulse, for example, greater than 1 ps but not significantly greater, for example, by no more than a factor of 10, preferably no more than a factor of 3. Simulations have demonstrated both the smoothing of background noise and the suppression of wide pulses even when they have the same total energy as an ultra-fast pulse.

Figure 10:
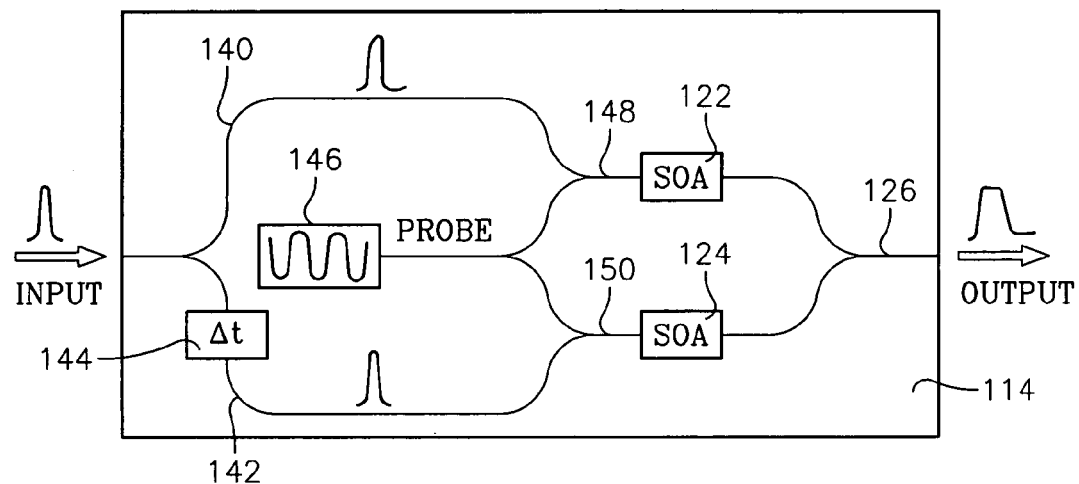
FIG. 10 is a schematic plan view of part of a second embodiment of an asymmetric Mach-Zehnder detector utilizing a pulsed CW optical probe.

The MZ interferometric detector is effective for detecting asynchronous signals, that is, signals that arrive at any time. However, a more capable approach is illustrated by the detector illustrated in schematic plan view in FIG. 10. An ultra-fast input pulse is divided into two arms 140, 142, One arm 142 has a time delay 144 of $\Delta t$ relative to the other arm 140, where the time delay may result from the delayed arm 142 having a slightly long length. A CW probe signal from a laser 146 is split and combined respectively with both the delayed and undelayed input signal pulse for input to respective arms 148, 150 of the Mach-Zehnder interferometer. The two MZ arms 148, 150 have the same length and include respective semiconductor optical amplifiers 122, 124 receiving two input pulses, one of which is delayed. The effect is much the same as for the timing diagrams of FIG. 9. The respective pulses quickly open the semiconductor optical amplifiers 122, 124 through which they pass but only slow close them thereafter. As a result, the probe signal follows the behavior discussed with respect to FIG. 9 so that the combined difference signal, if there is an input pulse, has a width of about $\Delta t$. Importantly, however, the laser 146 may be turned on and off. It is turned on, for example, in time slots allotted to this receiver so that the receiver operates as described. But when it is turned off in other time slots, the receiver is insensitive to any received input pulses. Such timed enablement of a receiver requires at least soft synchronization between the transmitters and receivers of the network for time scales on order of packet frame lengths, e.g. 100 ns.

Figure 11:
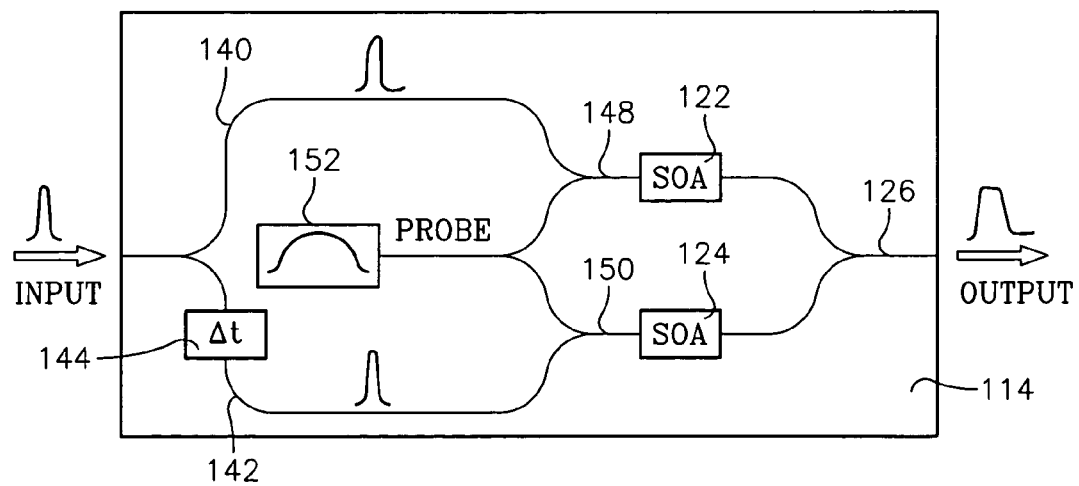
FIG. 11 is a schematic plan view of part of a third embodiment of an asymmetric Mach-Zehnder detector utilizing a pulsed optical probe.

A more demanding but more efficient approach, illustrated for the MZ detector of FIG. 11 uses an optical pulse generator 152 to produce a relatively narrow optical probe pulse but longer than the differential time delay $\Delta t$ imposed on the split input signal and also timed to occur with both the input signal pulses. Only during the time of the probe pulse will the detector be enabled. The probe signal strength, even when relatively short is significantly less than that of the input signals so that it is the probe signal that is being gated through the two semiconductor optical amplifiers 122, 124 by the input pulse.

The shorter the probe pulse, the better the receiver including both the decoder and the MZ detector can discriminate against unmatched codes as well as noise. However, short probe pulses require hard synchronization between the transmitters and receivers.

Again, the waveguides, probe source, and semiconductor amplifiers as well as a detector for detecting the output pulse can be fabricated on the same substrate as the receiver decoder to form a monolithic receiver. The amplifiers have the same vertical structure as the lasers. Further, as illustrated in the orthographic schematic diagram of FIG. 9, a monolithic O-CDMA transceiver 160 can be integrated on a single InP substrate 162 mounted on a silicon micro-bench 164 including contact pads 166 for wires to the active areas of the transceiver 160 and to the outside. The micro-bench 162 in turn is mounted on a single thermo-electric cooler 168. The transceiver 160 includes both an O-CDMA transmitter 170 including a decoder and an O-CDMA receiver 172 including a decoder. The transmitter 170 outputs an encoded pulse onto an output fiber 174 from an output waveguide 176 formed in the substrate to which the output fiber 174 is butt coupled. The receiver receives an encoded pulse from an input fiber 178 butt coupled to an input waveguide 180 formed in the substrate 162.

The transmitter 170 includes a pulse source including a ring laser 182 of a waveguide formed into a ring and including two active regions 184, 186 differentially biased into optical gain and absorption to produce a periodic source of ultra-fast pulses. The waveguide of the ring laser 182 is tangentially coupled into a linear waveguide 188 including a data modulator region 190, which may have the same structure as the active regions but is selectively biased into transparency and blocking by an electrical signal applied to it. The electrical signal corresponds to the sequence of binary states defining the data to be transmitted. The modulated data pulses enter the encoder including two array waveguide gratings (AWGs) 192, 194. The first AWG 192 acts a demultiplexer dividing the wavelength components of the ultra-fast pulses. The second AWG 194 acts as a multiplexer to recombine them after phase modulation. Modulator waveguides 196 connect the two AWGs 192, 194. Each modulator waveguide 196 includes a respective separately controlled phase modulation region 198 to selectively modulate the phase of the respective wavelength component. The set of signals applied to the modulator regions 196 constitute the CDMA code used to encode the outgoing pulse. The multiplexing AWG 194 combines the phase-modulated wavelength components to produce a spread pulse output onto the output fiber 174 through the output waveguide 176.

The receiver 172 includes a decoder receiving a spread pulse from the input fiber through the input waveguide 180. The encoder includes two array waveguide gratings 200, 202. The first AWG 200 receives the input waveguide 180 and acts as a demultiplexer to wavelength separate the wavelength components of the received spread pulse. The second AWG 202 acts as a multiplexer to recombine the spread pulse after decoding phase modulation. Modulator waveguides 204 connect the two AWGs 200, 202. Each modulator waveguide 204 includes a respective separately controlled phase modulation region 206 to selective modulate the phase of the respective wavelength component. The set of signals applied to the modulation regions 206 constitute the CDMA code used to decode the incoming pulses. The multiplexing AWG 202 combines the phase-modulated wavelength components. If the receiver CDMA code matches the CDMA code used to encode the received spread pulse, the output of the second AWG 202 is a sequence of ultra-fast pulses. Matching codes requires the receiver code to be the conjugate of the code used to encode the signal received at the receiver. If the receiver CDMA code does not match the CDMA code used to encode the received spread pulse and the unmatched codes are orthogonal or nearly so, the output of the second AWG 202 is barely distinguishable from noise.

The decoded optical signal enters an ultra-short pulse detector including a laser source 210 for a probe signal. In a silica-based transmission system, the network carries optical signals, in particular, the spread pulses, in a wavelength band of about 1535 to 1565 nm. In this case, the probe wavelength is preferably about 1520 nm. Depending upon the transmission protocol and other control equipment, the probe signal may be continuous CW, pulsed CW, or short laser pulses. The illustrated MZ detector follows that illustrated in FIG. 8, but the alternates of FIGS. 10 and 11 could be substituted. The decoded optical signal and the probe signal are combined and then split to enter the arm waveguides 212, 214 of an asymmetric Mach-Zehnder interferometer 216 in which the two arm waveguides 212, 214 have different lengths or otherwise impose a differential delay $\Delta t$ on the signals passing through the two arms. The two arm waveguides 212, 214 include respective semiconductor optical gain regions 217, 218 both biasing the active regions into gain, thereby providing cross-gain modulation between the probe signal and an intense input pulse and in particular modulating the probe signal with the ultra-fast data pulses. Because of saturation effects, the amplified probe signal has a short rise and long fall. There is an additional differential delay or phase difference of $\pi$ between the two arms so that the interferometer 216 is operating in differencing rather than summing mode and the differentially delayed amplified probe signal is recombined to produce a differential of the amplified probe signal in the two arm. A photodiode 220 formed in the substrate 162 receives the differential signal. The photodiode 220 may be formed with the standard active structure, which when negatively biased acts as a photo detector. If the CDMA codes match, the output of the photodiode 220 is a sequence of data modulated pulses having a pulse width of about $\Delta t$.

Figure 12:
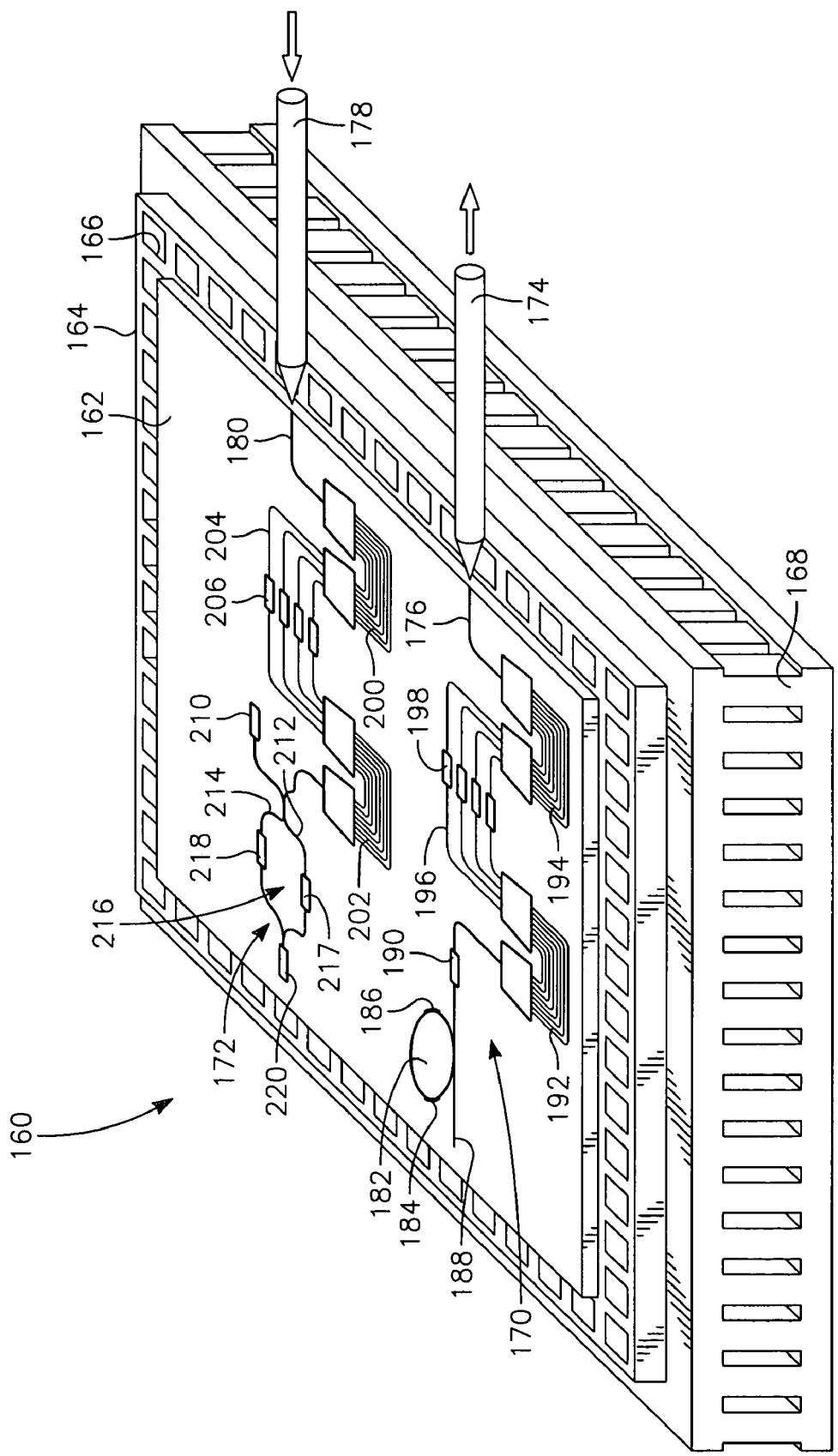
FIG. 12 is an orthographic view of an integrated O-CDMA transceiver

The transceiver 160 illustrated in FIG. 12 represents a high level of integration in a single substrate. Fabrication could be eased by implementing the transmitter 170 and receiver 172 on different substrates. Although it is possible to further integrate the electronic control functions into the same InP substrate, there are relatively few required electrical contacts to the opto-electronic components of the transceiver 160, principally the active regions 184, 186 of the ring laser, the data modulator region 190, the phase modulator regions 198, 204, the probe laser 210, the MZ cross-gain regions 216, 218, and the photodiode 220. As a result, it is feasible to implement the fast drive electronics in a separate chip and wire bond to the transceiver 160. However, it is preferred to follow the approach of the cited Yoo patent application and include the fast drive and detector electronics in a GaAs or fast Si chip that has bump soldered contacts to the opto-electronic regions of the transceiver substrate 162 and is bonded to it. Further, lower speed electronic control logic can be implemented in a silicon integrated circuit, such as a field programmable gate array, which is in turn bonded to the GaAs substrate.

Figure 13:
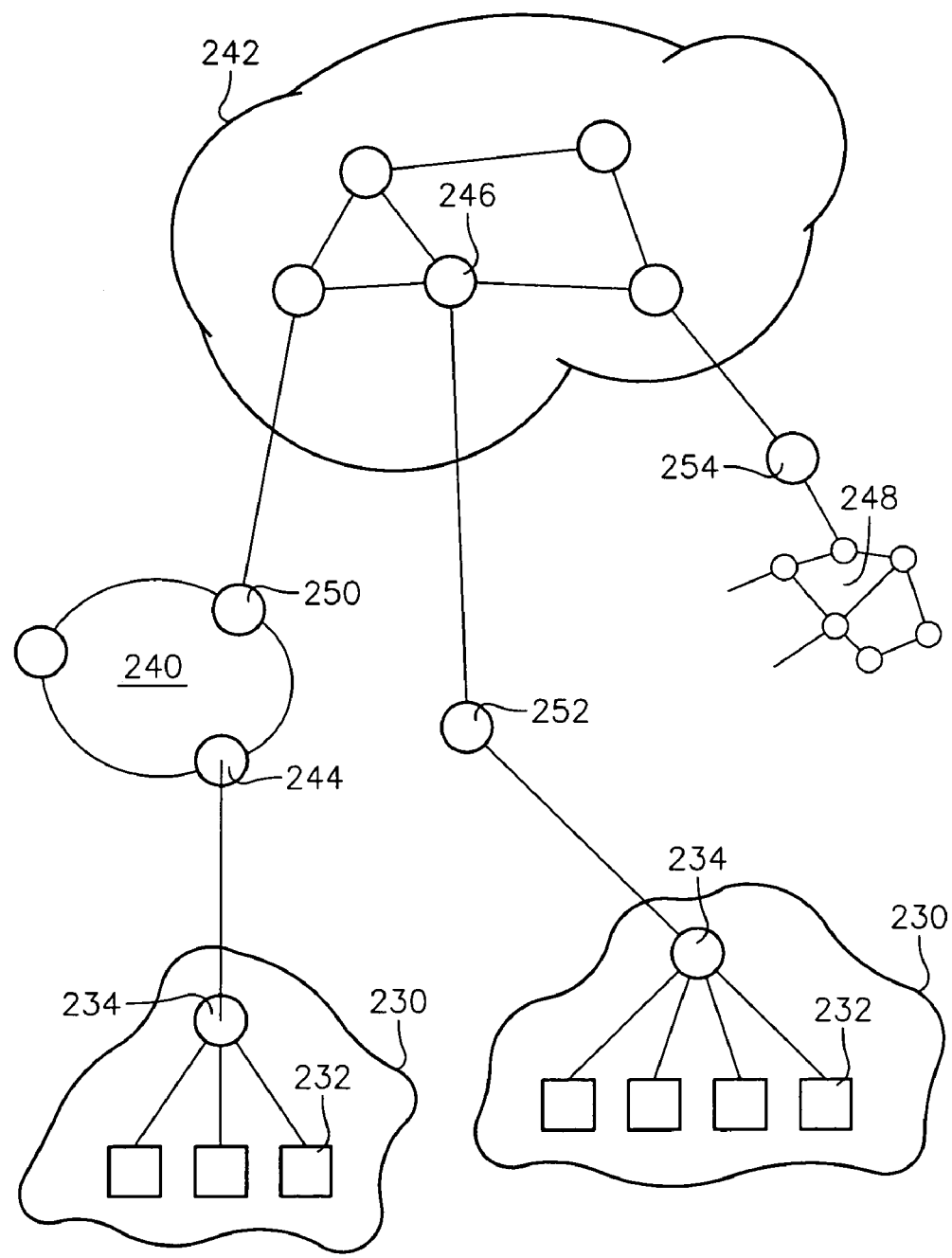
FIG. 13 is a network diagram illustrating various levels of a network through which a O-CDMA signal can be transmitted.

Although the O-CDMA transmitter and receiver can be applied to many different types of communication networks, it is felt that it is most advantageously applied, as illustrated in the schematic network diagram of FIG. 13, to local area networks (LANs) 230 in which multiple user terminals 232 are optically connected to a star coupler 234 through optical fibers or free space. The star coupler 234 simultaneously receives signals from any of the user terminals 232 and transmits them all to all of the user terminals 232, perhaps excluding the sending terminal. Such a LAN is most typically implemented in a single building or in a campus in which a limited of users, for example, numbering in the tens to thousands, are linked across relatively short distances. The terminals 232 of such LANs 230 typically operate at relatively low bit rates and the star couplers 234 can be mostly passive so that the LAN 230 can be assembled at relatively low cost. The LAN 230 may utilize the O-CDMA transmission of the invention by including one O-CDMA transceiver of FIG. 12 or a non-integrated version thereof at each of the user terminals 232. In the simplest embodiment, each user terminal 232 is assigned a CDMA reception code unique to the particular user terminal 232 which is applied to its receiver phase modulators. If another user terminal 232 wishes to send a message to that terminal 232, it applies the conjugate of the CDMA reception code of the intended terminal 232 to its transmitter phase modulators. Thereafter, the transmitter data the picosecond light pulses according to the binary data to be transmitted and then phase modulates the wavelength components.

The O-CDMA transceiver described with reference to FIG. 12 includes optical portions that operate in the picosecond range with pulse repetition rates chosen to be near 10 Gb/s. However, most of the associated electronics need not operate near 10 Gb/s. In one scheme, even the data modulator at the transmitter can operate at lower bit rates so that a single data bit at a lower bit rate similarly modulates multiple ultra-fast pulses. At the receiver, the multiple similar pulses can be optically detected at the lower bit rate as a single long pulse. As a result, except for the O-CDMA transceiver, each terminal may include low bit-rate electronics. Furthermore, transceivers of different bit rates may be connected to the same O-CDMA LAN with the transmission rate between two transceivers being limited by the lower bit rate of the communicating transceivers.

The intra-LAN transmission protocol described above is asynchronous in that a transmitter may send a signal at any time to any receiver with the proper CDMA code, and a transmitter is always waiting for a signal which has its reception code. The number of simultaneous users for an asynchronous system is limited by not only the number of codes but also by the interference between them when they are not completely orthogonal.

A LAN 230 may be connected to a larger network either through a metropolitan area network (MAN) 240 in turn connected to optical core network 242 or alternatively connected directly to the core network 242. A MAN 240 typically is formed in an optical fiber ring with add-drop multiplexers (ADMs) 244 arranged around the ring. A MAN conventionally operates with time division multiple access (TDMA) in which fixed time slots are assigned to different ADMs 244. More recent MANs include wavelength division multiplexing (WDM) in which the ADMs drop and add selected wavelength channels from the ring, sometimes in conjunction with TDMA. The O-CDMA LAN 230 can be easily integrated with a TDMA MAN 240 by assigning one MAN slot to a particular LAN 230. Each of the terminals of the MAN 230 then transmits only within the assigned slot, either within the LAN 230 or over the MAN 240. This requires soft synchronization of the LAN user terminals 232 to the slots of the MAN 240.

The core network 242 is preferably implemented with optical packet routing and optical label switching, as described by Yoo in U.S. patent application Ser. No. 10/341,237, filed Jan. 13, 2003. The OLS core network 242 then includes optical routers 246 that route the optical packets around the core network 242 according to routing information contained in the packet headers. The core network 242 may also be connected to a wired network 248 more representative of public telephone networks. Such packet routing requires edge routers 248, 250 to convert between OLS packets and the TDMA or CDMA transmissions of the MAN 240 or O-CMDA LAN 230 as well as an edge router 254 to the wired network 230.

If hard synchronism is imposed, a larger number of user terminals 232 can be interconnected in a LAN 230 either using one or more star couplers 234 or achieving similar broadcast capability, for example, arranged around a ring, if hard synchronism is imposed. In this case, a terminal 232 is assigned a relatively narrow time slot for reception. During the time slot, the terminal 232 outputs a relatively narrow probe pulse in its detector to allow the Mach-Zehnder to convert the signal pulse to the probe signal. For such narrow gating, the CDMA codes need not be so strictly orthogonal and could possibly be multiply used around the network. The tight synchronization, however, requires that the transmitter assure that its encoded pulse is received at the intended receiver during its narrow slot. Such tight synchronism can be achieved by the ALOHA method in which the star coupler 234 or other central node acts as coordination center for sending out timing pulses to the different terminals to determine what are the trip times. The sending terminal must add its trip time to the central node to the trip time to the receiving terminal and offset its transmission by this amount.

Figure 14:
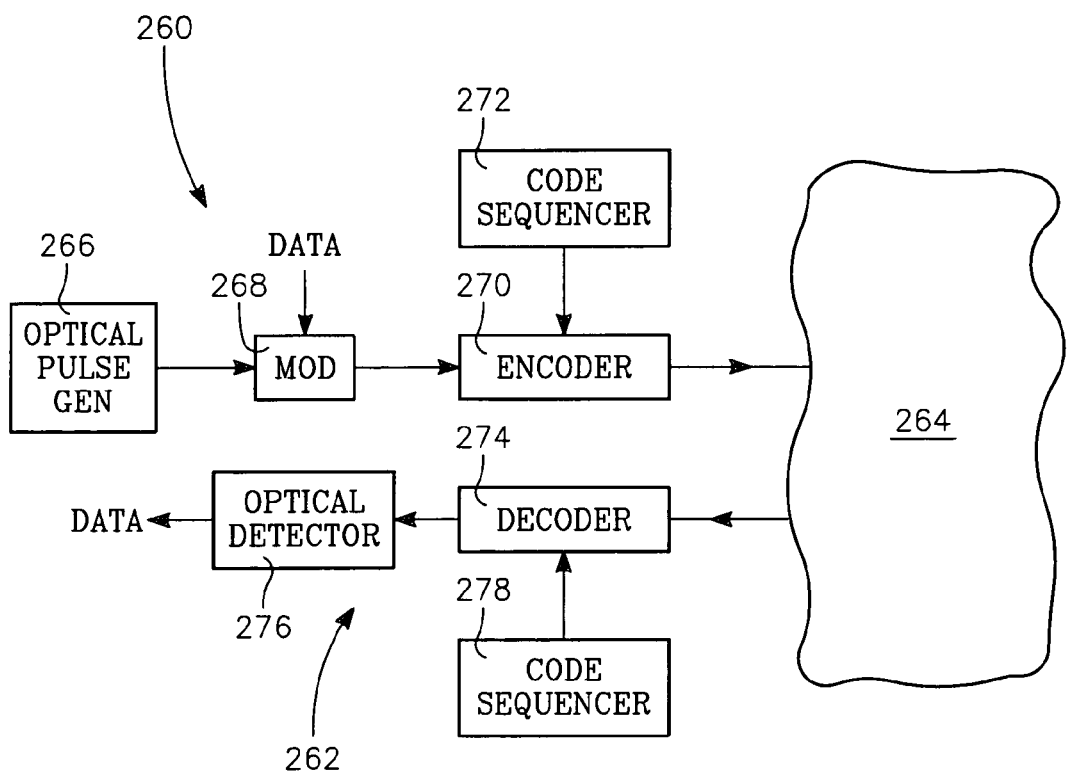
FIG. 14 is a block diagram of an O-CDMA transmission network using sequence of CDMA codes.

In some applications, it is desirable to provide additional security by using a time sequence of CDMA codes for a single transmission. As illustrated in the circuit diagram of FIG. 14, a user 260 wishes to securely send a message to user 262 through a network 264 subject to surveillance. The security provided by a CDMA code is considered to be inadequate in some situations because there are a limited number of codes so that a computerized spy could try all of them to determine which one provides a strong decoded message. According to this aspect of the O-CDMA transmission method the transmitter of the sending user 260 includes an optical pulse generator 266, data modulator 268, and a phase encoder 270, as previously discussed for O-CDMA. However, the encoder 270 does not use a single code matching that of receiving user 262 for the transmission. Instead, a code sequencer 272 inputs a series of codes to the encoder 270. Each code controls the phase modulation of the encoder 270 to produce a spread, encoded pulse on the network 264. However, the code sequencer 272 changes the codes during the transmission of the message. Depending on the bit rate of the transmitter, it is possible to change the code for each bit of the transmitted signal, that is, for every pulse or for a group of identically modulated pulses. There are 256 distinct 8-bit two-level codes. Since these may occur in any order, such a fixed sequence effectively provides a 2048-bit code over a 256 bit message. Longer codes are even stronger. These numbers can be further increased by a sequence that is non-cyclic over the 256 bits.

The receiving user 262 includes a decoder 274 and an optical detector 276, as previously discussed for O-CDMA. However, another code sequencer 278 provides a sequence of codes for use in the decoder 274. The sequence of codes at the receiver 262 needs to match (in conjugates) the sequence of codes 272 at the transmitter 260 if the signal is to be properly detected. Furthermore, the two sequences need to be synchronized to at least the data bit rate.

O-CDMA can be combined with WDM in which a WDM channel is dedicated to O-CDMA of the sort described above with other WDM channels perhaps being used for other communication protocols. This results in operation in a different time regime since each of the WDM channels typically have a bandwidth of about 1 nm, rather than the 30 nm described above. As a result, the unmodulated pulses are much wider but the wavelength separation needs to be performed on a finer scale. Nonetheless, such an approach does not require dedicated fiber.

It is thus seen that spectrally spread optical code division multiplexing, particularly when integrated on one or a few chips, can be configured to provide economical communication among a substantial number of users or to provide a highly secure transmission.

What is claimed is:

1. A CDMA communications system, comprising:
    a transmitter including
        a source of optical pulses having a pulse width of no more than 10 ps,
        a first optical demultiplexer receiving said optical pulses and dividing them into first wavelength components thereof on a plurality of first waveguides,
        a plurality of separately controlled first phase modulators disposed on respective ones of said first waveguides to phase modulate said first wavelength components according to a first code, and
        a first optical multiplexer connected to said first waveguides and combining said wavelength components into a second waveguide configured for input to an optical transmission system; and
    a receiver including
        a second optical demultiplexer configured to receive optical signals from said optical transmission system and dividing them into second wavelength components thereof on a plurality of second waveguides,
        a plurality of separately controlled second phase modulators disposed on respective ones of said second waveguides to phase modulate said second wavelength components according to a second code, and
        a second optical multiplexer connected to said second waveguides and combining said second wavelength components, and
        an optical detector receiving said combined second wavelength components.

2. The communication apparatus of claim 1, wherein when said optical pulses from said source are modulated to form a data pulse train, when second code is a conjugate of said first code, said data pulse train is reconstructed at an output of said optical detector.

3. The communication apparatus of claim 1 formed into no more than four substrates.

4. The communications apparatus of claim 3 formed into no more than two of said substrates.

5. The communications apparatus of claim 4, formed into no more than one said substrate.

6. The communication apparatus of claim 1 comprising a plurality of said transmitters and a plurality of said receivers.

7. The communications apparatus of claim 1, wherein said optical detector is an asymmetric Mach-Zehnder detector comprising:
    two arm waveguides receiving an output of said second optical multiplexer them therethrough with propagation delays differing by a predetermined time and also receiving on both of said arms a predetermined probe signal;

two active regions disposed on said two arm waveguides; and a photo detector receiving a combined output of said two arms.

8. The communications apparatus of claim 7, wherein said two active regions include positive biased semiconductor junctions, whereby said combined output is an output pulse having a pulse width of at least but equal to but less than twice said predetermined time.

9. An O-CDMA communication method, comprising the steps of:

at a transmitter
generating a sequence of optical pulses having a pulse width of no more than 10 ps,
modulating said optical pulses according to a binary first data signal,
spectrally separating said modulated optical pulses into first wavelength components,
electrically phase modulating said first wavelength components according to a selected first one of a plurality of CDMA codes;
spectrally combining said phase modulated first wavelength components to produce an encoded signal for transmission onto an optical communications network; and at a receiver
spectrally separating a signal received from said optical communications network into second wavelength components,
electrically phase modulating said second wavelength components according to a selected second one of said plurality of CDMA codes,
spectrally recombining said phase modulated second wavelength components to produce a decoded signal, and
detecting said decoded signal to produce a detected data signal.

10. The method of claim 9, wherein said detected data signal is substantially more similar to said first data signal is said first one and said second one of said plurality of CDMA codes are the same than if they are different.

11. The method of claim 9, wherein said steps are performed in no more than four monolithically integrated substrates.

12. The method of claim 9, wherein said CDMA codes comprise at least four levels.

* * * * *